UNITED STATES PATENT OFFICE.

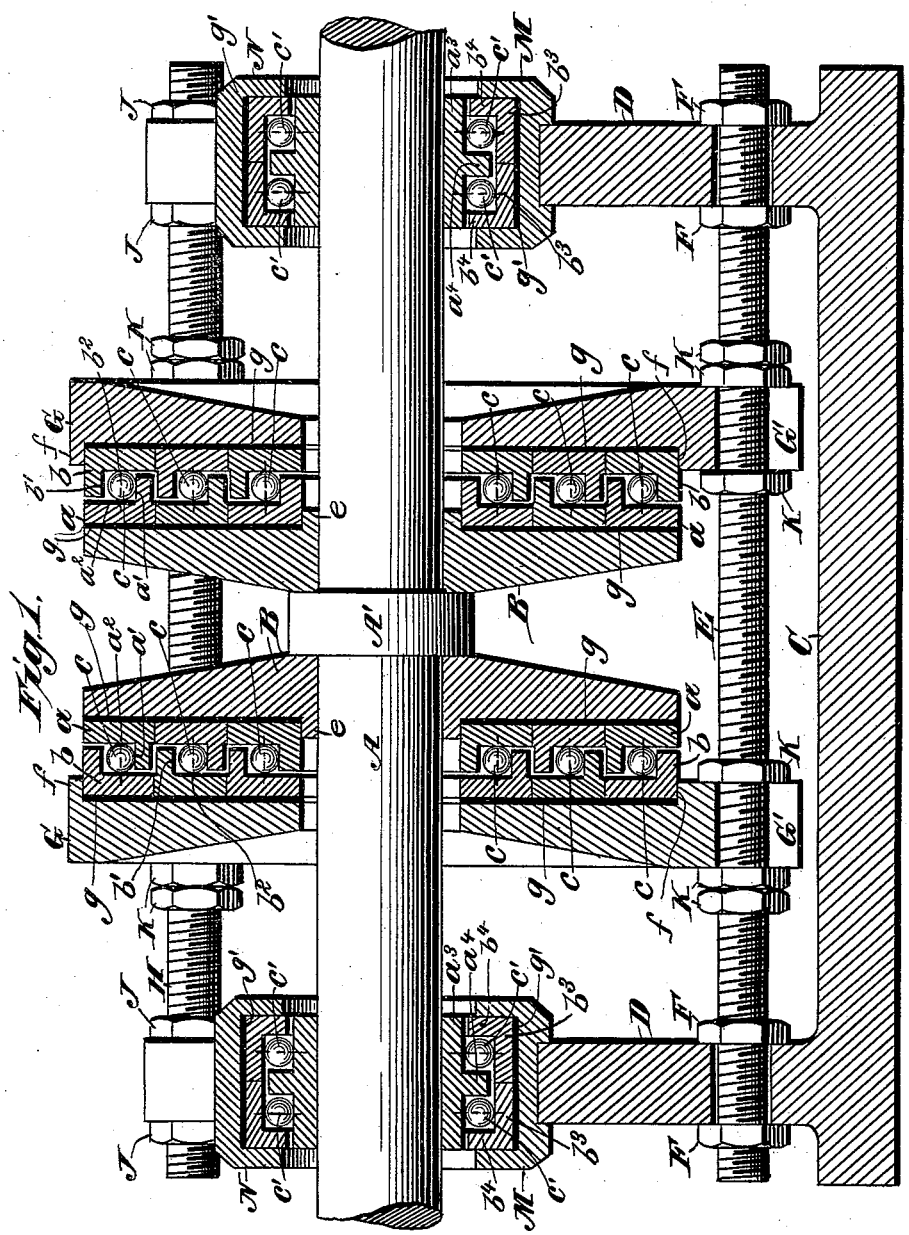

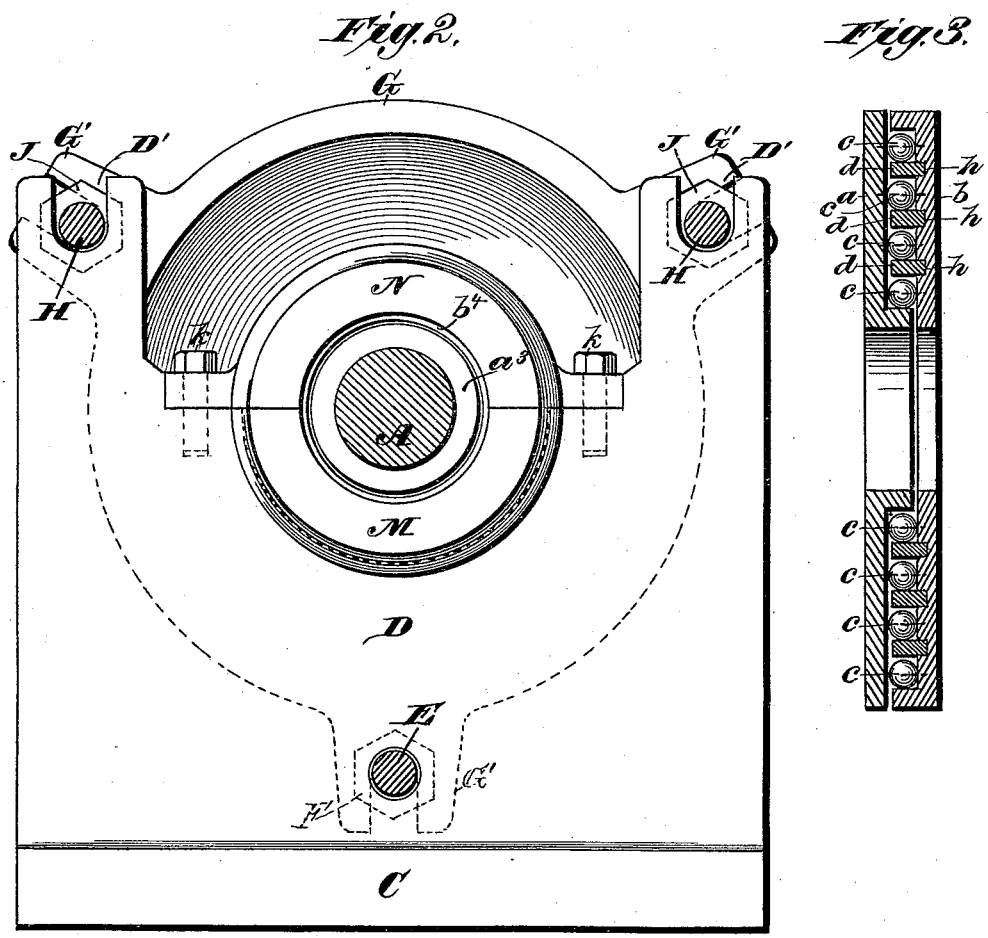

GEORGE F. SIMONDS, OF FITCHBURG, MASSACHUSETTS.

BALL-BEARING.

SPECIFICATION forming part of Letters Patent No. 449,952, dated April 7, 1891.

Application filed July 3, 1890. Serial No. 357,675. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

My invention relates to bearings in which circular series or groups of spherical rollers or balls are employed to diminish friction.

The object of my said invention is to provide, especially, an improved bearing for resisting or transmitting the end-thrust or end pressure of screw-propeller and other shafts, and also a bearing or bearings for taking the radial pressure of such shafts.

My invention comprises the combination, with a rotary shaft and parts secured from longitudinal movement thereon and revolving therewith, of stationary or non-rotating parts surrounding said shaft adjacent to the said rotating parts and concentric series or groups of spherical rollers or balls arranged between and bearing against the parallel plane surfaces of said rotating and non-rotating parts to roll thereon and resist the longitudinal or end thrust of said shaft in either direction.

My invention also comprises the combination, with a rotary shaft and a rotating part carried by said shaft and secured from longitudinal movement thereon, of a stationary or non-rotating part surrounding said shaft adjacent to the said rotating part, concentric pairs of adjacent L-shaped rings or annular pieces supported between and by said rotating and non-rotating parts, and concentric series or groups of spherical rollers or balls arranged between and bearing against the parallel plane surfaces of said rings or annular pieces to roll thereon and resist longitudinal or end thrust of the shaft.

My invention also comprises the combination, with a rotary shaft or part, a stationary or non-rotating part, and spherical rollers or balls arranged between said rotating and non-rotating parts, of an elastic washer or packing to cushion the force of pressure or blows.

My invention further comprises a propeller-shaft or other shaft provided with circular series of spherical rollers or balls arranged in concentric series or groups to resist longitudinal pressure, and other circular series of spherical rollers or balls arranged to support the radial pressure or weight of the shaft, and the whole supported in a suitable bed or frame-work, from which the said shaft and its ball-bearings can be readily removed in a body.

In the accompanying drawings, Figure 1 is a partly-sectional side elevation illustrating my improvements in bearings for propeller-shafts and other shafts. Fig. 2 is an end elevation of the same. Fig. 3 is a detail sectional view illustrating a modification in which the concentric series of balls are separated by concentric series of hoops that are supported in slots formed in one of the ball-inclosing rings or annular pieces to retain the balls in circular series.

A is a shaft having a circumferential rib, projection, or collar A' thereon.

B B are annular disks secured to the shaft A on each side of its circumferential rib, projection, or collar A', and which revolve with said shaft.

C is a base-plate or support having standards D D located opposite to each other.

E is a bolt that connects the lower ends of the standards D D, and is preferably screw-threaded throughout its entire length.

F F are nuts to secure the bolt E to the standards.

G G are stationary or non-rotary annular disks, each having upper and lower radial arms G' G'. The upper arms G' of the opposite stationary disks G are bifurcated to engage screw-bolts H of sufficient length to rest in notches D', formed in the upper ends of the standards D on each side of the shaft, and while resting in said notches the bolts H H are secured in place by nuts J J on opposite sides of the standards. The bifurcated lower arms of the stationary disks G are adapted to engage and rest on the screw-bolt E, and the said disks are adjustable to and from each other along the bolts E and H by means of adjusting-nuts K K on said bolts. The stationary disks G G are centrally perforated for passage of the shaft A, but are not in contact therewith, being supported independent of said shaft by means of the bolts E and H, as above described.

Between the revolving disks B and the stationary or non-rotating disks G are arranged the inner and outer L-shaped rings or flanged annular pieces $a$ $b$, which are formed with concentric surfaces $a'$ $b'$ and with plane bearing-surfaces $a^2$ $b^2$, parallel to each other and at right angles to the said concentric surfaces. In the annular channels or cavities thus formed between the rings or annular pieces $a$ $b$ are placed the spherical rollers or balls $c$, arranged in concentric series or groups bearing on the parallel plane surfaces $a^2$ $b^2$, while retained in place by the concentric surfaces $a'$ $b'$ of said rings $a$ $b$, as shown in Fig. 1, or by separating-hoops $d$, placed between the several circular series of balls $c$, as shown in Fig. 3.

The direction of the pressure upon the balls $c$ is clearly indicated in Figs. 1 and 3 by dotted lines passing horizontally through the points of contact of the balls with the parallel plane surfaces.

In Fig. 1 I have shown the concentric series or groups of balls $c$ arranged between the concentric and plane parallel surfaces of several concentric pairs of L-shaped rings or flanged annular pieces $a$ $b$, that are held in place between the revolving disks B and stationary or non-rotating disks G, as shown. The disks B are each provided with an annular shoulder $e$, on which the concentric rings $a$ are supported, and the disks G are each provided with an annular shoulder $f$, by which the concentric rings $b$ are retained in place. Between these disks B G and the rings or annular pieces $a$ $b$ are placed annular washers or packing-rings $g$ $g$, that are also held in place by the shoulders $e$ and $f$. These washers $g$ $g$ are made of leather, rubber, or other suitable elastic material that will compensate for any slight inequalities in the fit of the disks and rings. It will be seen that by means of the adjusting-nuts K K on the screws E and H the stationary or non-rotating disks G can be adjusted inward, as required, to take up any slight wear of the rings and cause the parts to be held in proper operative position.

By arranging the disks B G and interposed bearing devices, as described, on each side of the circumferential rib, projection, or collar A', which secures them from longitudinal movement on the shaft A, effective and reliable provision is made for resisting or transmitting the end-thrust or longitudinal pressure of the shaft A from either direction in which it may be exerted, and the friction is reduced to a minimum.

Instead of the concentric pairs of L-shaped rings or annular pieces $a$ $b$, (shown in Fig. 1,) I may place between the disks B G a single pair of L-shaped rings or annular pieces $a$ $b$, inclosing concentric series or groups of balls $c$, separated and retained in circular series by concentric hoops $d$, that are secured in concentric grooves or slots $h$, formed in one of said L-shaped rings or annular pieces, as shown in Fig. 3.

For the purpose of supporting the shaft A and resisting the radial pressure the standards D D are each provided with a box M, having a removable cap or cover N, provided with screw-bolts $k$ $k$ for holding it in place.

Surrounding the shaft A within each box M is a T-shaped sleeve or tube $a^3$, having a central circumferential rib, projection, or collar $a^4$, that extends into the space between the flanges $b^4$ on the outer ends of the rings or annular pieces $b^3$, that are located end to end in the box M, as shown in Fig. 1, with balls or spherical rollers $c'$ $c'$ arranged between and rolling on the concentric surfaces of said sleeve $a^3$ and rings $b^3$ and retained in place by the parallel surfaces of the collar $a^4$ and opposite flanges $b^4$, so that the radial thrust on said balls will be in the direction indicated by the vertical dotted lines.

In the box or case M, surrounding the annular flanged rings $b^3$, I prefer to place a packing band or ring $g'$, of leather, rubber, or other elastic material, adapted to cushion the bearing.

It will be observed that by opening the boxes or cases M M and loosening the nuts J J and lower nuts F F the shaft, with its ball-bearings, can be bodily removed from the supporting frame-work.

I do not wish to be understood as broadly claiming herein the ball-bearings shown, described, and claimed in the several Letters Patent issued to me August 19, 1890.

What I claim as my invention is—

1. In a ball-bearing, the combination, with a rotary shaft, of parts secured from longitudinal movement on said shaft and to revolve therewith, stationary or non-rotating parts surrounding said shaft adjacent to said rotating parts, and concentric series or groups of spherical rollers or balls arranged in the same vertical plane between and bearing against the parallel plane surfaces of said rotating and non-rotating parts to roll thereon and resist the longitudinal or end thrust of said shaft in either direction, substantially as described.

2. In a ball-bearing, the combination, with a rotary shaft and a rotating part secured from longitudinal movement on said shaft and revolving therewith, of a stationary or non-rotating part surrounding said shaft adjacent to the said rotating part, concentric pairs of adjacent L-shaped rings or annular pieces supported between and by said rotating and non-rotating parts, and concentric series or groups of spherical rollers or balls arranged in the same vertical plane between and bearing against the parallel plane surfaces of said rings or annular pieces to roll thereon and resist longitudinal or end thrust of the shaft, substantially as described.

3. In a ball-bearing, the combination, with a rotary shaft and a rotating part secured on said shaft, of a stationary or non-rotating part, spherical rollers or balls arranged between said rotating and non-rotating parts, and an elastic washer or packing to cushion the force of pressure or blows, substantially as described.

4. In a ball-bearing, the combination, with a rotating shaft, of disks secured from longitudinal movement on said shaft and revolving therewith, stationary or non-rotating disks surrounding said shaft adjacent to the rotating disks, rings or annular pieces located between the said rotating and non-rotating disks and having parallel plane surfaces at right angles to the shaft, and concentric series of spherical rollers or balls arranged in the same vertical plane between and bearing against the parallel plane surfaces of said rings or annular pieces to roll thereon and resist the longitudinal or end thrust of said shaft in either direction, substantially as described.

5. In a ball-bearing, the combination, with a rotary shaft, of disks secured from longitudinal movement on said shaft and revolving therewith, stationary or non-rotating disks surrounding said shaft adjacent to the rotating disks, rings or annular pieces located between the said rotating and non-rotating disks and having parallel plane surfaces at right angles to the shaft, spherical rollers or balls arranged between and bearing against the parallel plane surfaces of said annular pieces to roll thereon and resist the longitudinal or end thrust of said shaft in either direction, and elastic washers between said rings or annular pieces and the rotating and non-rotating disks, substantially as described.

6. A propeller or other shaft provided with circular series of spherical rollers or balls arranged in concentric series in the same vertical plane to resist longitudinal pressure, and other circular series of spherical rollers or balls arranged to support the radial pressure or weight of said shaft and located in the vertical plane of the longitudinal pressure-resisting rollers or balls, the whole supported in a proper bed or frame-work, substantially as described.

7. In a ball-bearing, the combination of a sleeve having a circumferential projection, rings or annular pieces concentric with said sleeve and having circumferential projections, circular series of balls arranged between the circumferential projection on said sleeve and rings, the whole inclosed in a case or box, and an elastic washer located between said sleeve or rings and the box or casing, substantially as described.

In testimony whereof I have affixed my signature in presence of two witnesses.

GEO. F. SIMONDS.

Witnesses:
JAMES A. RUTHERFORD,
PERCY B. HILLS.